Feb. 1, 1955

C. V. JOHNSON 2,700,941

PELLET MACHINE

Filed April 3, 1950

CLYDE V. JOHNSON
INVENTOR.

BY Hazard & Miller

ATTORNEYS

Feb. 1, 1955

C. V. JOHNSON 2,700,941

PELLET MACHINE

Filed April 3, 1950

CLYDE V. JOHNSON
INVENTOR.

BY

Hazard & Miller
ATTORNEYS

United States Patent Office 2,700,941
Patented Feb. 1, 1955

2,700,941

PELLET MACHINE

Clyde Vern Johnson, Los Angeles, Calif.

Application April 3, 1950, Serial No. 153,680

6 Claims. (Cl. 107—8)

This invention relates to apparatus for producing pellets from moldable material, and is a continuation-in-part of my copending application filed April 2, 1948, Serial No. 18,598.

A main object of the present invention is to increase the output of a pellet producing apparatus without increasing the speed of the primary elements. In my prior application, above identified, there is disclosed a pellet apparatus having a stationary annular orificed die with rotatable extruding rollers within the die and rotatable knives contacting the exterior of the die. In the present invention the annular die is made rotatable and the die and rollers are rotated in reverse directions therefore doubling the output from the die by making the speed of the die equal to that of the rollers.

Another main object of the present invention is to increase the output of a pellet producing apparatus without increasing the speed or size of the elements, and this is accomplished by providing a double bank system of steam inlet nozzles which so direct steam into a mixing chamber as to make the moldable mass easier to extrude than heretofore possible.

Another object of the present invention is to provide an improved manner of mounting the knives or cutting means so that the rigidity of the cutting means and the knives is markedly increased and also so that the lubrication system of the cutting means mounting system is not subjected to the direct flow of steam. In the present invention this is accomplished by mounting the knives on a mounting plate which is, in turn, mounted on the bottom of the mixing chamber, whereas in my prior invention the knives were suspended from a mounting plate which was, in turn, mounted from the upper portion of the chamber.

Another object of the present invention is to provide a conveying system around an annular die to convey the pellets which are cut to an outlet and thereby reduce the amount of breakage and crumbling of the pellets and preserving the gloss on the pellets.

Another object of the present invention is to provide an improved manner of mounting the feed hopper of a pellet producing apparatus for vertical adjustment.

Another object of the present invention is to provide an improved manner of lifting the cover or hood over the mixing and cutting chambers of a pellet producing apparatus of the type disclosed in my prior application.

Another object of the present invention is to provide means for escape of excess steam from the mixing chamber of a pellet producing apparatus to thereby prevent backing up of the flow of feed into the chamber.

With the foregoing and other objects in view, which will be made manifest in the following detailed description and specifically pointed out in the appended claims, reference is had to the accompanying drawings for an illustrative embodiment of the invention, wherein:

Figure 1 discloses a view in elevation, partly in section, of a pellet producing apparatus embodying the present invention;

Figure 1:
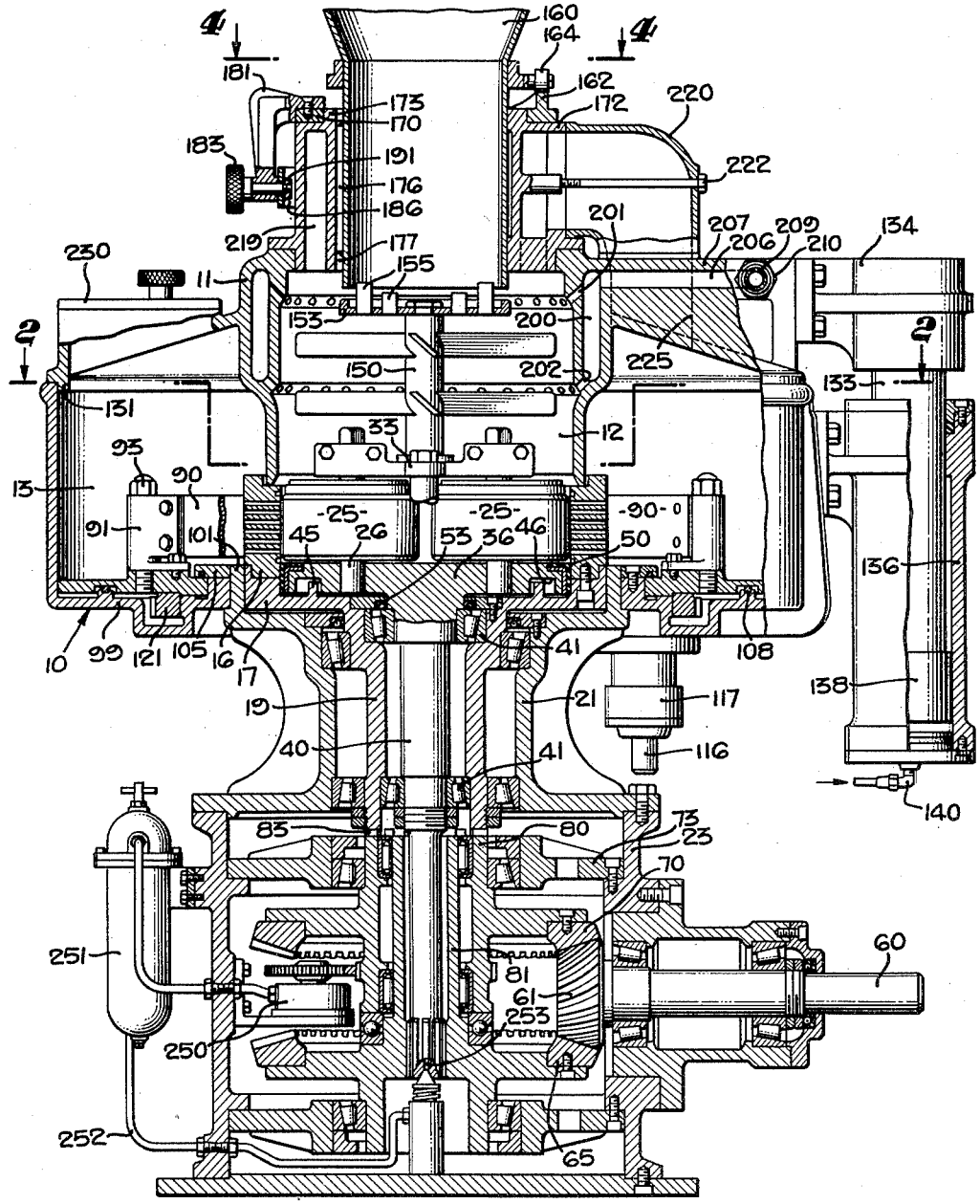

Referring to the accompanying drawings wherein similar reference characters designate similar parts throughout, the pellet producing apparatus comprises a body generally entitled 10 having a cover portion 11, the body providing an inner mixing chamber 12 and an outer annular chamber 13. There is an annular radially orificed die 16 rotatably mounted within body 10 by means of a mounting plate 17 having a tubular stem 19 extending therefrom and which is rotatably mounted in a hollow support 21 which supports the body 10, said hollow support being mounted on a housing 23 which houses the means for driving the annular die 16.

Figure 3:
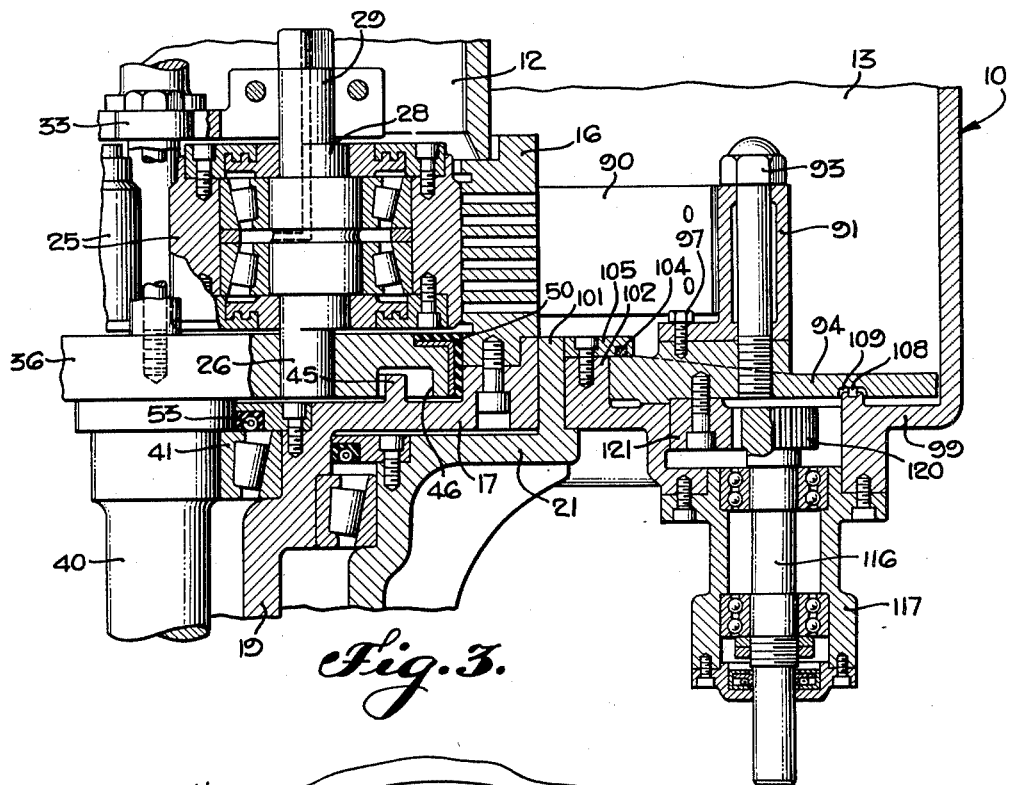
Fig. 3 is a fragmentary sectional view in elevation along lines 3—3 of Fig. 2.
Figure 4:
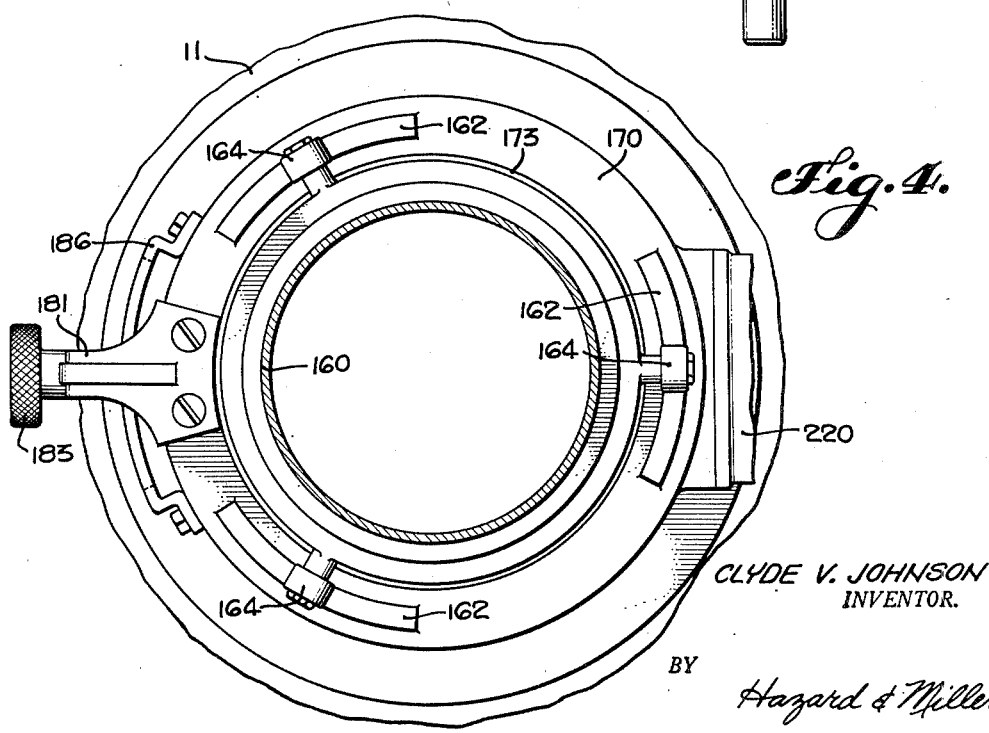
Fig. 4 is a fragmentary sectional view in plan along lines 4—4 of Fig. 1.

Within annular die 16 there are rollers 25 which are mounted for axial movement about posts 26 which have eccentrics 28 and end portions 29 fitting within the split arms of a spider 33 and a supporting plate 36, compare Figs. 1 and 3. The supporting plate 36 has a stem 40 which is rotatably mounted in tubular stem 19 by bearings 41. Mounting plate 17 for annular die 16 is provided with an annular rib 45 fitting within an annular groove 46 provided by the mounting plate 36 for rollers 25, the annular rib and groove construction providing a seal. Sealing means 50 is provided about the periphery of mounting plate 36 for rollers 25 so that sealing means 50 in conjunction with annular rib 45 and annular groove 46 prevents any of the moldable material from passing down and between the mounting plate 36 and mounting plate 17. There is also provided another seal 53 above the upper bearing 41 to protect the bearing from any moldable material which might get past the other seals.

Means are provided for rotating the annular die 17 and the rollers 25 in reverse directions and these means include a drive shaft 60 having a driving gear 61 mounted thereon, said drive shaft being rotatably mounted in housing 23. Driving gear 61 engages a lower driven gear 65 which is splined to stem 40 which supports rollers 25 and driving gear 61 also meshes with driven gear 70 which is rotatably mounted by a plate 73 in housing 23, driven gear 70 having a hub 80 rotatably mounted about the hub 81 of driven gear 65. Hub 80 for driven gear 70 is drivingly connected to tubular sleeve 19 through ring gears 83 provided respectively on tubular sleeve 19 and hub 80. It will, therefore, be seen that the annular die 16 is driven in one direction by driven gear 70 and rollers 25 are driven in the opposite direction by driven gear 65.

Disposed around the exterior of annular die 16 are a plurality of pellet cutting knives 90 which are fixedly secured to mounting plates 91 which are, in turn, rotatably mounted about pivot screws 93 which are threaded into an annular supporting and conveying plate 94. Mounting plates 91 are provided with slots 96 through which extend adjusting screws 97 which thread into annular plate 94 permitting adjustment of cutting knives 90 toward and away from the exterior of annular die 16. In my prior application there was an annular plate 94 provided but it was mounted from the upper part of the chamber, and therefore, did not provide near as rigid a support for the cutting knives as the mounting plate 94 of the present invention since the mounting plate 94 is mounted on the bottom 99 provided by body 10. Although the annular and conveying mounting 94 is shown as being rotatably mounted by sliding contact with the bottom 99 provided by body 10 it is understood that any equivalent means can be used such as roller bearings and the like. Hollow member 21 provides an upstanding rim 101 within which mounting plate 17 for annular die 16 rotates. Bottom 99 is provided with an upstanding rim 102 lying next to rim 101 and a suitable seal 104, preferably of neoprene or the like, is supported against mounting and conveying plate 94 by a seal mounting plate 105 which is secured to rim 102. Bottom 99 is grooved to receive a seal 108 which is positioned within an annular groove 109 on mounting and conveying plate 94 and engages the last-named plate for sealing purposes.

Figure 2:
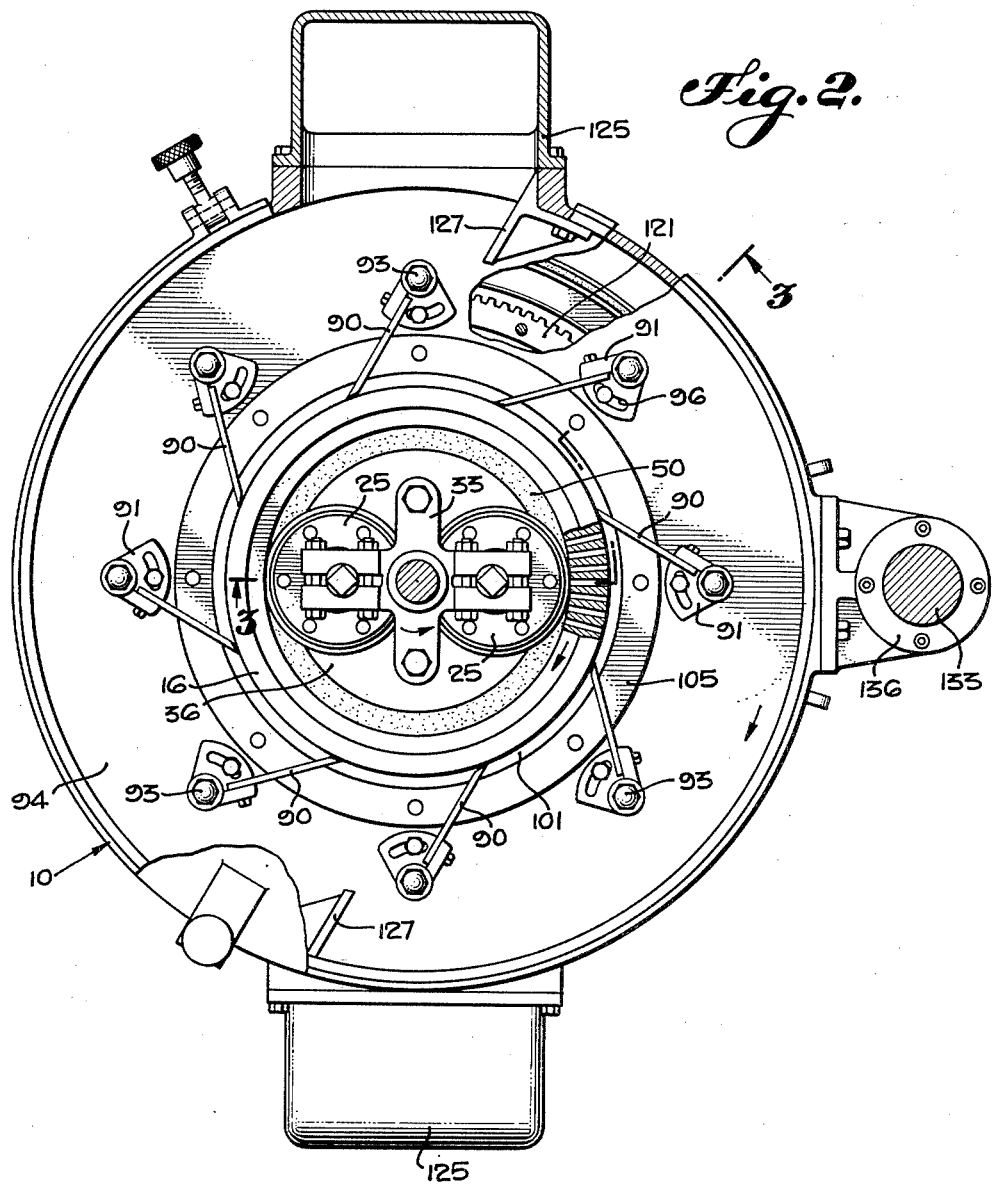
Fig. 2 is a view in plan partially in section along lines 2—2 of Fig. 1.

In the preferred form of the invention the mounting and conveying plate 94 is driven in the same direction as the annular die 16, but it is contemplated that in certain cases the conveying plate 94 may be driven in the reverse direction from the annular die 16. Driving the mounting and conveying plate 94 in either direction is readily obtainable since plate 94 is independently driven from the other rotating units and by a drive shaft 116 rotatably mounted in sleeve 117 from bottom 99 of body 10, said drive shaft having a driving gear 120 meshing with an annular ring gear 121 secured to plate 94 as shown in Fig. 3. With this independent drive through drive shaft 116, the plate 94 and therefore the knives 90 can be driven either in the same direction as annular die 16 or in the opposite direction although as before stated, it is preferred that the knives be moved in the same direction but at a slower speed than the speed of the die and the arrows in Fig. 2 indicate the preferred direction of rotation of the primary elements. It is obvious that if plate 94 is stationary the knives 90 will perform their cutting functions but annular plate 94 is not only a plate upon which knives 90 are mounted but it is also a conveying plate and there would be under these circumstances no conveying function performed. Therefore, it is contemplated that there will be some rotative movement of annular conveying and mounting plate 94 during use of the machine. It is also contemplated that a separate conveying plate and a separate mounting plate can be provided and each independently driven so that the knives could be stationary and still have a conveying plate to convey the pellets to an outlet.

During use of the machine centrifugal force will cause the pellets to be thrown toward the periphery of annular plate 94 and these pellets will be thrown out through an outlet 125 provided on body 10. There is a deflector member 127 secured to the side walls provided by body 10 to deflect into the outlet 125 any pellets which are not thrown by centrifugal force into the outlet 125.

The hood or cover 11 which forms a portion of the body 10, the body having a lower portion and an upper portion, is provided with a depending rim 131 to fit within the upstanding walls provided by the lower portion of body 10. Hood or cover 10 is pivotally mounted from the lower portion of the body 10 by a piston 133 secured by a sleeve 134 to the hood or cover 11, said piston sliding within a cylinder 136 secured to the lower portion of body 10, the piston having suitable sealing means between itself and the cylinder 136. The lower end of piston 133 has an enlargement 138 forming the piston proper and there is an inlet line 140 for directing hydraulic fluid into the cylinder 136 to raise the piston and therefore the hood or cover 11. Suitable valves of ordinary construction are provided for controlling the flow of hydraulic fluid through line 140 to cylinder 136, said valves allowing raising and lowering of the hood or cover 11.

There is a mixing and distributing vane unit 150 secured to mounting plate 36 for rollers 25, said mixing and distributing vane unit being similar to the construction in my previous application and is rotated upon rotation of stem 40 to thoroughly mix the feed or material fed to the apparatus with steam supplied to the chamber 12, and this unit 150 also serves to distribute the feed mass uniformly around the mixing chamber. There is a feeder valve 153 mounted on the top of unit 150, said feeder valve being supplied with stepped magnets 155 to pick up scrap iron, tramp and the like, which is in the feed, and feeder valve 153 has an upstanding peripheral rib or flange for trapping any of this undesirable material.

Feeder valve 153 cooperates with a feed hopper 160 to regulate the flow of feed into chamber 12 and means are provided for raising and lowering said hopper 160 with relation to the feeder valve 153 to vary the rate of flow of feed into the chamber and these means include cams 162 having circular operative faces which cooperate with followers 164 mounted on feed hopper 160 to raise the feed hopper when the cams 162 are rotated with respect to the feed hopper 160, said cams being mounted on a movable annular mounting member 170 which is rotatably mounted on a supporting member 172, as shown in Fig. 1, said supporting member having an annular rib 173 against which the member 170 bears. Feed hopper 160 is provided with a key 176 which slides within a key slot 177 provided in supporting member 172 and therefore preventing rotation of feed hopper 160 but allowing raising and lowering of the same. Means for holding the feed hopper in adjusted position are provided and comprise an arm 181 secured to cam mounting ring 170 and having a thumb screw 183 rotatably extending therethrough, said thumb screw also extending through a circular longitudinally slotted bracket 186 which is secured to supporting member 172. Thumb screw 183 is provided with a nut 191 on the inner end thereof, and since thumb screw 181 extends within the slot provided in bracket 186 it is obvious that thumb screw 183 can be turned to release the arm 181 from bracket 186 allowing shifting of arm 181 within the limits of bracket 186 thereby raising and lowering feed hopper 160.

The upper portion 11 of body 10 which forms the cover or hood for the lower portion of body 10 provides an annular steam chamber 200 and there is an upper bank of steam inlet nozzles 201 leading from annular chamber 200 into the mixing chamber 12 and a lower bank of steam inlet nozzles 202 leading from annular steam chamber 200 into mixing chamber 12. The upper bank of nozzles 201 direct steam onto the mixing and distributing vane unit 150 and onto the feed being mixed by the vane unit but the lower set of nozzles 202 are directed generally below the vane unit 150 and on to the moldable material just prior to its being extruded through the orificed die 16. Applicant has discovered there has been a marked increase in output by providing these two banks of steam inlet nozzles. Applicant does not know the exact reason for the remarkable increase obtained but believes that it is due to the fact that the feed can only absorb a certain amount of steam per unit of time and if there are only one set of nozzles there is a relatively limited time within which the feed can absorb the steam and that is during the mixing period, but if a second bank of nozzles are provided for directing steam onto the moldable material just prior to extruding then the moldable material is given an additional opportunity to absorb more steam and become therefore easier to extrude which may account for the increased output by the use of these dual banks of these steam inlet nozzles.

Annular steam chamber 200 is supplied with steam through a passageway 206 in a web 207 of hood or cover 11 and there is a conduit 209 which may be flexible and which is connected by suitable nipple 210 to passageway 206 for conveying steam to the passageway.

Another novel construction of applicant's apparatus concerns the manner of leading off excess steam thereby preventing the excess steam from impeding the free flow of feed through the hopper 160 since the steam does not have a chance to build up pressure within mixing chamber 12 if there is a vent in the mixing chamber. The supporting member 172 is provided with an annular chamber 219 and there is a connecting elbow 220 secured to supporting member 172 by bolt 222, said elbow leading to a passageway 225 provided in cover or hood 11 and which passageway 225 is divided by web 207 as can best be seen in Fig. 1. Therefore, the excess steam in chamber 12 can flow upwardly into the annular chamber 219 provided in supporting member 172 through elbow 220 down through hood 11 and into outer chamber 13 and then through the outlet 125.

A cover 230 may be provided on hood 11 to allow inspection of the cutting knives and the cutting knife mounting means.

A lubrication system similar to the lubrication system shown in my prior application is provided for the present unit and is adequately described in my prior application, and therefore need not be elaborated on in detail. This lubricating system comprises an oil pump 250, a filter 251, an oil line 252 leading to the bore 253 within stem 40 which feeds oil to the rollers 25 through a lubricating system similar to that shown in my prior application.

It is contemplated that the mounting and feed conveying plate 94 will be supplied with oil on the under side thereof through the lubricating system to lessen wear on this plate. By supporting the annular conveying plate 94 from the bottom 99 of the body 10, longer wear of the plate is obtained since the oiling system for the plate is not subjected to the direct flow of steam as it was in my prior application wherein there was provided an annular knife mounting plate which was mounted near the upper portion of the chamber, and therefore, subjected to the direct flow of steam.

The operation of the various parts of the pellet producing apparatus have been explained along with the description and so no lengthy explanation is deemed necessary. As has been before explained, the annular die 16 and the rollers 25 are driven in opposite directions and the knives 90 are preferably driven in the same direction but at a lesser speed than that of the annular die 16. The moldable material is mixed with steam by the mixing and distributing unit 150 and the moldable mass is extruded through the die 16 cut by the knives 90, conveyed by the annular conveying plate 94 to the outlet 125.

Various changes may be made in the details of construction without departing from the spirit and scope of the invention as defined by the appended claims.

I claim:

1. In a pelleting machine, a material mixing chamber body having an open base portion, means for depositing material into said mixing chamber, at least one set of mixing vanes within said chamber, a pair of inclined rows of steam nozzles communicating with a source of steam in said mixing chamber, one of said rows having its steam nozzles inclined toward said mixing vanes and the other of said rows having its steam nozzles inclined toward said open base portion, and means for discharging the steam.

2. In a pelleting machine, a material mixing chamber body having an open base portion, means for depositing material into said mixing chamber, a plurality of sets of mixing vanes within said chamber, a steam chest integral with said body and communicating with a source of steam, a pair of inclined, substantially parallel rows of steam nozzles integral with said steam chest and communicating with said mixing chamber, one row of nozzles inclined toward one set of vanes and the other row of nozzles inclined toward said open base portion, and means for discharging the steam.

3. In a pelleting machine, a material mixing chamber body having an open base portion, means for depositing material into said mixing chamber, a vertical, rotatable shaft releasably secured to said mechanism and extending into a portion of said mixing chamber, a plurality of sets of spaced, inclined mixing vanes on said shaft, a pair of inclined, substantially parallel rows of steam nozzles communicating with a source of steam and said mixing chamber, one row of nozzles inclined toward the uppermost set of vanes and the other row of nozzles inclined toward said open base portion, and means for discharging the steam.

4. In a pelleting machine, a material mixing chamber body having an open base portion, means for depositing material in said mixing chamber, a vertical, rotatable shaft releasably secured to said mechanism and extending into a portion of said mixing chamber, a pair of sets of parallel inclined mixing vanes on said shaft, a pair of inclined, substantially parallel rows of steam nozzles communicating with a source of steam and said mixing chamber, one row of nozzles being in a plane parallel to and overlying the uppermost row of vanes and inclined toward said vanes, the other row of nozzles being in substantially the same plane as the second row of vanes and inclined toward said open base portion, and means for discharging the steam.

5. In a pelleting machine, a material mixing chamber body having an open base portion, means for depositing material in said mixing chamber, a vertical, rotatable shaft releasably secured to said mechanism and extending into a portion of said mixing chamber, a pair of sets of parallel inclined mixing vanes on said shaft, a pair of inclined, substantially parallel rows of steam nozzles communicating with a source of steam and said mixing chamber, one row of nozzles being in a plane parallel to and overlying the uppermost row of vanes and inclined toward said vanes, the other row of nozzles being in substantially the same plane as a second row of vanes and inclined toward said open base portion, means for discharging steam, and a feeder valve on the uppermost free end of said shaft disposed between said vanes and said means for depositing material.

6. In a pelleting machine, a material mixing chamber body having an open base portion, means for depositing material in said mixing chamber, a vertical, rotatable shaft releasably secured to said mechanism and extending into a portion of said mixing chamber, a pair of sets of parallel inclined mixing vanes on said shaft, a pair of inclined, substantially parallel rows of steam nozzles communicating with a source of steam and said mixing chamber, one row of nozzles being in a plane parallel to and overlying the uppermost row of vanes and inclined toward said vanes, the other row of nozzles being in substantially the same plane as a second row of vanes and inclined toward said open base portion, means for discharging the steam, a feeder valve on the uppermost free end of said shaft disposed between said vanes and said means for depositing material, and means on the feeder valve for separating impurities from the material.

References Cited in the file of this patent

UNITED STATES PATENTS

| Number | Name | Date |
|---|---|---|
| 911,816 | Gielow | Feb. 9, 1909 |
| 1,954,086 | Meakin | Apr. 10, 1934 |
| 1,993,249 | Scholz | Mar. 5, 1935 |
| 2,146,776 | Storminger | Feb. 14, 1939 |
| 2,241,546 | Evenstad | May 13, 1941 |
| 2,498,209 | Iredale | Feb. 21, 1950 |